United States Patent
Tischer

(10) Patent No.: US 8,171,516 B2
(45) Date of Patent: May 1, 2012

(54) METHODS, SYSTEMS, AND STORAGE MEDIUMS FOR PROVIDING MULTI-VIEWPOINT MEDIA SHARING OF PROXIMITY-CENTRIC CONTENT

(75) Inventor: Steven Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1371 days.

(21) Appl. No.: 10/785,914

(22) Filed: Feb. 24, 2004

(65) Prior Publication Data
US 2005/0188399 A1    Aug. 25, 2005

(51) Int. Cl.
*G06F 3/00*      (2006.01)
*G06F 13/00*    (2006.01)
*H04N 5/445*    (2011.01)
*H04N 7/16*      (2011.01)
*H04N 7/18*      (2006.01)

(52) U.S. Cl. ............ 725/62; 725/37; 725/148; 348/143; 348/153; 348/158; 348/159

(58) Field of Classification Search ........................ None
See application file for complete search history.

(56) References Cited

U.S. PATENT DOCUMENTS

| | | | |
|---|---|---|---|
| 4,870,700 A | 9/1989 | Ormanns et al. | |
| 5,680,441 A | 10/1997 | Gallo | |
| 5,926,101 A | 7/1999 | Dasgupta | |
| 6,697,103 B1 * | 2/2004 | Fernandez et al. | 348/143 |
| 6,809,760 B1 * | 10/2004 | Takagi et al. | 348/211.9 |
| 6,947,071 B2 * | 9/2005 | Eichmann | 348/142 |
| 6,956,614 B1 * | 10/2005 | Quintana et al. | 348/373 |
| 7,079,176 B1 | 7/2006 | Freeman et al. | |
| 7,266,396 B2 | 9/2007 | Terzian et al. | |
| 7,321,387 B2 * | 1/2008 | Novais et al. | 348/211.11 |
| 7,323,991 B1 | 1/2008 | Eckert et al. | |
| 7,370,077 B2 | 5/2008 | Pradhan et al. | |
| 7,382,798 B2 | 6/2008 | Sugaya | |
| 7,426,197 B2 | 9/2008 | Schotten et al. | |
| 2001/0026552 A1 | 10/2001 | Spratt et al. | |
| 2001/0045978 A1 * | 11/2001 | McConnell et al. | 348/42 |
| 2002/0009971 A1 | 1/2002 | Spratt | |
| 2002/0039135 A1 * | 4/2002 | Heyden | 348/143 |
| 2002/0093493 A1 * | 7/2002 | Michaeli et al. | 345/173 |
| 2003/0067542 A1 * | 4/2003 | Monroe | 348/148 |
| 2003/0093797 A1 * | 5/2003 | Bazzaz | 725/74 |
| 2003/0117316 A1 | 6/2003 | Tischer | 342/357.1 |
| 2004/0029582 A1 | 2/2004 | Swab et al. | |
| 2004/0074448 A1 | 4/2004 | Bunt et al. | |
| 2004/0156616 A1 | 8/2004 | Strub et al. | |
| 2005/0135286 A1 | 6/2005 | Nurminen et al. | |
| 2006/0046719 A1 | 3/2006 | Holtschneider | |
| 2006/0062175 A1 | 3/2006 | Ling et al. | |
| 2006/0074645 A1 | 4/2006 | Tischer | |
| 2006/0128447 A1 | 6/2006 | Tischer et al. | |
| 2006/0209744 A1 | 9/2006 | Tischer | |

* cited by examiner

*Primary Examiner* — Justin Shepard
(74) *Attorney, Agent, or Firm* — Cantor Colburn LLP

(57) ABSTRACT

Exemplary embodiments of the invention relate to methods, systems, and storage mediums for providing multi-viewpoint, media-sharing activities related to proximity-centric media content associated with an event whereby the media-sharing activities are performed via portable communications devices. The method includes identifying an alternate feed of media content by a first portable communications device that was captured by a second portable communications device at the event. The method also includes performing real-time auditioning of the media content by the first portable communications device for assessing a vantage point of the media content with respect to the event. The method further includes receiving the alternate feed of media content at the first portable communications device in response to a request transmitted by the first portable communications device. The first portable communications device and the second portable communications device are in geographic propinquity of the event.

22 Claims, 5 Drawing Sheets

MULTI-VIEWPOINT MEDIA ACCESS SYSTEM

MAIN MENU
SELECT FROM THE FOLLOWING OPTIONS:

REGISTER FOR CONTENT SERVICE

EDIT EXISTING CONTENT SERVICE

HELP

NEW USER/REGISTRATION

ENTER YOUR PERSONAL INFORMATION BELOW:

NAME _____

ADDRESS _____

SELECT FROM THE FOLLOWING SERVICES:

PREMIUM PACKAGE
STANDARD PACKAGE
BASIC PACKAGE

PREMIUM PACKAGE INCLUDES ONE-YEAR UNLIMITED ACCESS TO ALL MEDIA CONTENT FOR ALL EVENTS PRESENTED AT THIS ARENA

FIG. 4

METHODS, SYSTEMS, AND STORAGE MEDIUMS FOR PROVIDING MULTI-VIEWPOINT MEDIA SHARING OF PROXIMITY-CENTRIC CONTENT

BACKGROUND OF INVENTION

The present invention relates generally to media sharing of content, and more particularly, to methods, systems, and storage mediums for providing multi-viewpoint media sharing of proximity-centric content.

When groups of people gather together for an event such as a music concert, they often call friends on their cellular telephones to share the concert experience in real time via the telephone or similar mobile communications device. With the recent proliferation of mobile communications devices, this type of behavior is becoming more prevalent whereby event attendees raise their devices in the direction of the event in order to broadcast the audio and/or video content to the respective calling-receiving parties.

The quality of the media content being captured by event attendees can vary quite significantly depending upon their location in the event arena. While many attendees have access to acceptable vantage points with respect to an event, some attendees are subject to visual obstructions such as physical elements associated with the structural design of an event arena or the event's attendant equipment, and visual impairments and/or audio distortions resulting from poor seating. These impairments may impede both the attendee's ability to fully appreciate the event experience, as well as the attendee's ability to share the event with another individual via the portable communications device.

What is needed, therefore, is a way to provide multi-viewpoint media sharing of content among individuals that are in geographic proximity of one another.

SUMMARY OF INVENTION

The above-stated shortcomings and disadvantages are overcome or alleviated by methods, systems, and storage mediums for providing multi-viewpoint, media sharing of proximity-centric content associated with an event whereby the media sharing is performed via portable communications devices. The method includes identifying an alternate feed of media content by a first portable communications device that was captured by a second portable communications device at the event. The method also includes performing real-time auditioning of the media content by the first portable communications device for assessing a vantage point of the media content with respect to the event. The method further includes receiving the alternate feed of media content at the first portable communications device in response to a request transmitted by the first portable communications device. The first portable communications device and the second portable communications device are in geographic propinquity of the event.

Embodiments also include a system for providing multi-viewpoint media-sharing activities related to proximity-centric media content associated with an event. The system includes a first portable communications device and a second portable communications device in geographic propinquity of the first portable communications device. The system further includes a multi-viewpoint media access system executing on the first portable communications device and the second portable communications device. The multi-viewpoint media access system identifies an alternate feed of media content that has been captured by the second portable communications device at the event. The multi-viewpoint media access system also enables the first portable communications device to perform real-time auditioning of the media content for assessing a vantage point of the media content with respect to the event. The multi-viewpoint media access system further enables the first portable communications device to receive the alternate feed of media content in response to a request transmitted by the first portable communications device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES:

FIG. 4 is a sample user interface provided by the multi-viewpoint media access system as seen by a user of the system in exemplary embodiments.

DETAILED DESCRIPTION

The multi-viewpoint media access system enables media content sharing among portable communication devices that are proximally located, using optimal (e.g., best effort) peer-to-peer discovery and transmission exchange processes, as well as a multi-networking relay system for enhanced media content transmission and value-added services. The multi-viewpoint media access system discovery processes may include portable communications device sensors that identify signals transmitted by other compatible portable communications devices for initiating an exchange of content. A portable communications device 'auditions' one or more 'discovered' portable communications devices to determine an optimal vantage point and may select the desired portable communications device (i.e., originating portable communications device) from which a transmission feed is executed. The multi-viewpoint media access system further enables the receiving portable communications device to share the content received from the originating portable communications device to a third portable communications device. The third portable communications device may be proximally located to the receiving portable communications device or may be a remote device. Portable communications devices may include cellular telephones, digital camera phones, video camera phones, personal digital assistants (PDAs), and other handheld communications devices. The multi-viewpoint media access system may be implemented using a variety of wireless and wireline networking technologies such as a packet-switched network, a cellular network, a public switched telephone network (PSTN), and may include available technologies such as satellite, global positioning, and other resources.

Figure 1:
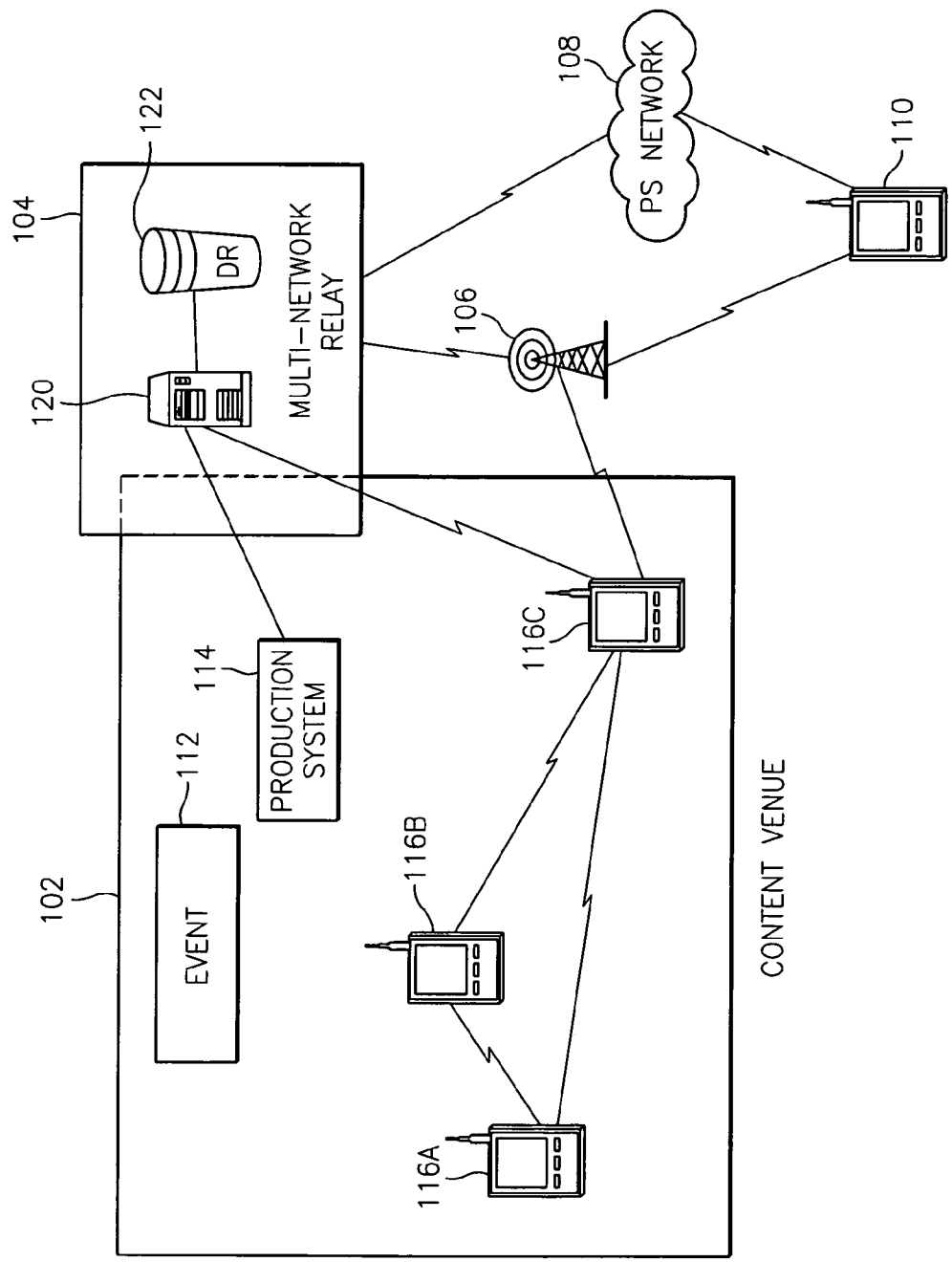
FIG. 1 is a block diagram of a system upon which the multi-viewpoint media access system may be implemented in exemplary embodiments.

Referring now to FIG. 1, a system upon which the multi-viewpoint media access system may be implemented is depicted. FIG. 1 includes a content venue 102, a multi-network relay system 104, and a remote communications device 110 in communication with one another via a communications network such as a cell tower 106, public-switched telephone network (not shown), and/or Internet 108, to name a few.

In exemplary embodiments, content venue 102 represents a physical location whereby a planned event 112 is conducted for the benefit of event-goers. Content venue 102, for example, may be a stadium and event 112 is a sporting event. In another example, content venue 102 may be a concert hall and event 112 is a musical event or concert. However, it will be understood by those skilled in the art that content venue 102 may also include a location in which an unplanned event has occurred (or is in the process of occurring) such as a natural disaster, a terrorist attack, an emergency situation, or other unscheduled event whereby groups of people are gathered and may benefit from receiving an alternate feed of media content in order to assess the risks involved relating to the unplanned event. For example, in a building fire, occupants may share content (in a peer-to-peer fashion) in order to determine the safest possible exit location and/or exit route with respect to the occupants' current location at a given time.

Also included in content venue 102 are portable communications devices 116A-C. While only three portable communications devices are shown in content venue 102, it will be understood that any number of portable communications devices may be present in order to realize the advantages of the invention. Users of portable communications devices 116A-C are typically event-goers for a planned event 112 or may be spectators/passers-by in proximity of an unplanned event 112 as described above. Types of portable communications devices 116A-C may include cellular telephones, personal digital assistants (PDAs), camera telephones, video telephones, or other portable wireless communications devices. The multi-viewpoint media access system may be executed entirely, or in part, on portable communications devices 116A-C via a user interface (e.g., FIG. 4) which, for example, may include a visual presentation of menu options presented on a device screen or may be audio options presented on a cellular telephone.

In alternate embodiments, one or more of portable communications devices 116A-C may comprise a information-generation component such as an accelerometer, altimeter, global positioning system, and sensor-based components such as temperature sensors, motion sensors, sound sensors, and biometric sensors, to name a few. Temperature sensors may measure internal or ambient temperatures, and sound sensors may measure volume, resonance, intonation, modulation, or other sound-based measurements. Motion-based sensors may include an infrared feature for detecting movement. Information produced via information-generation components may be transmitted among portable communication devices 116A-C and remote communication device 110 in addition to, or in lieu of, the media content described above with respect to event 112.

In exemplary embodiments, production system 114 comprises a high-powered camera system for capturing high-quality images, voice, data, etc., from event 112. In alternative embodiments, production system 114 may comprise a network of cameras dispersed around content venue 102, linked together by communications lines or cables. Where event 112 is unscheduled, production system 114 may or may not be present at content venue 102, depending upon the nature and duration of the unscheduled event. In this scenario, most of the features of the multi-viewpoint media access system are implementable in a peer-to-peer manner (e.g., via portable communications devices 116A-C and remote device 110) as will be described in FIG. 2A. If present, production system 114 may work in cooperation with multi-network relay system 104 to provide extended multi-viewpoint media access system services to portable communications devices 116A-116C and remote device 110 as described further in FIGS. 2-4.

FIG. 1 also includes multi-network relay system 104. In exemplary embodiments, multi-network relay system 104 represents a provider of multi-viewpoint media access system services for registered service members. Service members refer to users of portable communications devices 116A-C, and optionally remote communications device 110, that have registered with multi-network relay system 104 to obtain multi-viewpoint media access system services. For example, a portable communications device user (e.g., 116A) has poor seating at content venue 102 and desires to obtain high-quality media content of event 112. The quality of service possible from production system 114 is typically greater than that available to other portable communications device users at event 112 due, in part, because of the optimal location of production system 114 with respect to event 112 in addition to the advanced camera equipment used by production system 114. Multi-network relay system 104, working in conjunction with production system 114, is able to provide this higher quality content feed to portable communications device 116A. Thus, a basic service that may be provided by multi-network relay system 104 is a high-quality media content feed of event 112 to portable communications device 116A.

Through the registration process, other additional services may be offered and are contemplated by the multi-viewpoint media access system. For example, collaborative activities such as opinion polling associated with event 112 among event-goers with portable communications devices may be initiated whereby multi-network relay system 104 tallies votes and presents the results to registered portable communications device users. Contests or other incentives to register or maintain registration may be offered to portable communications device users. Registered service members may be able to vote on their favorite song where the event is a music concert, resulting in a performance of the winning song by the event performers. Another example may be selecting a winning contestant who is a registered service member to appear back stage to meet the event performers. Additionally, the media content may be interspersed with alternative content, such as recorded interviews of the event performers, event trivia, advertisements, etc.

Server 120 may comprise a high-speed processor such as a mainframe computer. Server 120 includes a web server for communicating with users of packet-switched portable communications devices with web browsers. Server 120 enables registration processes for portable communications devices (and optionally remote communications device 110) and maintains service member records in data repository 122. Service member records store personal information about the registered communications device users, as well as information about the type of communications devices that are registered in order to identify and facilitate multi-viewpoint media access system features and services in accordance with the communications devices' capabilities. Server 120 may also track multi-viewpoint media access system service usage for charging the service member and/or for marketing research. Data repository 122 stores service member records and comprises a data store that is logically addressable to server 120. As indicated above, the multi-viewpoint media access system may be executed entirely, or in part, on portable communications devices 116A-C via a user interface (e.g., FIG. 4) or may be executed by server 120, or a combination of both communications devices 116A-C, 110 and server 120.

Multi-network relay system 104 may be physically located at content venue 102 but is more likely to be remotely located from content venue 102.

Remote communications device 110 refers to a communications device remotely located from venue 102. Remote communications device 110 may be a portable or wireline telephone, a portable or wireline computer device such as a laptop, personal digital assistant, desktop computer, or other similar communications device. Further, remote communications device 110 may include one or more of the information-generation and sensor-based components described above with respect to portable communications devices 116A-C. Remote communications device 110 is in communication with one or more of portable communication devices 116A-C via a communications network such as cell tower 106, PSTN, or a packet-switched network such as Internet 108, etc.

Cell tower 106 comprises telecommunications equipment for enabling wireless communications among portable communications devices such as one or more of portable communications devices 116A-C and remote device 110. Packet-switched network 108 may be the Internet or other suitable network system capable of transmitting packet-switched data between communications devices.

The multi-viewpoint media access system of the invention may be implemented via a process as described in FIG. 2. While the process described in FIG. 2 represents execution of the multi-viewpoint media access system for multi-media portable communications devices (e.g., camera/video telephones), it will be understood that other media types may be shared using the multi-viewpoint media access system. Further, in addition to the media event 112, a variety of other types of information may be shared using the multi-viewpoint media access system. For example, a user of a portable communication device may transmit temperature information to another user or the sender's physical coordinates via a global positioning component of the invention.

The process begins at 200 and assumes that a portable communications device such as portable communications device 116A is in the process of capturing, or attempting to capture, media content for an event at venue 102 of FIG. 1. The process of FIG. 2 also assumes that the user of the portable communications device is interested in obtaining a different vantage point of the event via the portable communications device, either because the user's current vantage point is poor or because the user is simply seeking a different point of view. The user of portable communications device 116A searches for an alternate feed of media content for the event at 202. This step is referred to as the discovery process. Discovery can be accomplished using a variety of techniques. For example, discovery may occur using a multi-band device where an alternative part of spectrum transmits and discovers other devices. In other embodiments, discovery may occur using a telecommunications-centric registration scheme that determines which communications devices are close enough to assist one another as described in U.S. patent application Ser. No. 10/027,215, filed on Dec. 21, 2001, entitled "Systems and Methods for Locating and Tracking a Wireless Device", which is assigned to the assignees of the instant application and is incorporated herein by reference in its entirety. Embodiments further include sensors adapted to a portable communications device in which the user has elected to share media content with others. In this manner, the user pushes a button on the device that sends out a broadcast via peer networking which allows discovery of the device, as well as the discovery of similar preferences or potential.

At 204, it is determined whether one or more alternate feeds are available to the user of portable communications device 116A. If a search does not result in the discovery of an alternate feed at 204, the process ends at 206. This search may be iteratively performed indefinitely, for a set period of time, or for a set number of attempts before notifying the user that the search was unsuccessful. The user may opt to initiate a new search or wait a short time before re-instituting a search. For illustrative purposes, the available alternate feeds include devices 116B, 116C, and multi-network relay system 104. A list of alternate feeds available, namely 116B, 116C, and multi-network relay system 104 is presented to portable communications device 116A at 208. The user of portable communications device 116A selects from the list at 210.

At 212, it is determined whether the selection chosen by the user is multi-network relay system 104. If so, the process continues at 234 described in FIG. 2B. Otherwise, the user 'auditions' the selected alternate feed at 214. Auditioning refers to the act of evaluating the desirability of the content received from another source. Auditioning includes reviewing the alternate feed of media content for a limited amount of time. Before determining whether to accept the alternate feed being auditioned, the user may wish to audition other alternate feeds on the list, if present. At 216, it is determined whether the user wishes to continue auditioning. If so, the process returns to 208 whereby the alternate feed list is presented to the user. If the user does not wish to continue auditioning at 216, it is then determined whether the user wishes to view the media content via the alternate feed that was previously auditioned at 218. If not, the process ends at 220 and the user continues to experience the event via portable communications device 116A from the existing vantage point. If, on the other hand, the user decides to view the media content via the alternate feed previously auditioned, the user selects this feed from the alternate feed list at 222.

As indicated above, media content may be auditioned using information obtained by information-generation components of communications devices. For example, using a GPS-enabled communications device, a user may attempt to discover media content that originates from a second GPS-enabled communications device that resides at a specific location within venue 102 (e.g., center stage). In this manner, the user would audition only those location-specific feeds. Information generation components may also include altimeters, accelerometers, and sensor-based components as described above.

With respect to an unplanned event, such as the building fire described above, information-generation components could be used by a building occupant to 'audition' viable escape routes (from portable communications devices dispersed in various locations around the building) and select the route determined to have the least possible risk.

Once selected, the alternate feed of media content is transmitted from the selected portable communications device (e.g., 116B or 116C) presented to the user of portable communications device 116A at 224 for viewing. At 226, it is determined whether the user of portable communications device 116A desires to transmit the selected alternate feed of media content to another portable communications device. For example, the user of portable communications device 116A may wish to transmit the media content to another event-goer or to a remote communications device such as device 110. If the user of portable communications device 116A decides to transmit the alternate feed of media content to a third portable communications device at 226, the user enters the recipient portable communications device user's contact information into portable communications device 116A at 228 and initiates a communications transmission in accordance with the type of portable communications device used at 230. If the user does not wish to transmit the alternate feed of media content to another communications device, the process ends at 232.

As indicated above at 212, if the selected alternate feed is multi-network relay system 104, the process continues at 234 where it is determined whether the user is a registered service member. If not, the user so indicates via portable communications device 116A and a registration process is initiated at 236. The registration process includes submitting personal data to multi-network relay system 104 such as name, phone number, email address, or other contact information, and may include providing information regarding the type of portable communications device being registered. This portable communications device type information may be useful in determining which networking capabilities are compatible with the portable communications device, as well as its optional features and functions. As portable communications devices vary from manufacturer to manufacturer, and range in capabilities and features, this type of information may be helpful in assisting the user in selecting services provided by the media-sharing system as described further in step 238. Alternate embodiments include providing registration and media content services described herein to remote communications device 110. Where remote communications device 110 represents a non-ticket holder, the extent of services offered to device 110 may be limited. Multi-relay network system 104 would distinguish ticket-holders (e.g., event-goers with tickets) from non-ticket holders (remote service members) using, for example, a rules-based process.

During the registration process, the user may be presented with a list of available services at 238. Services may include the ability to receive a higher quality of media content than that which may be possible via the user's device. Services may also include receiving supplemental content that is provided by multi-network relay system 104 such as advertising, special offers, discounts on venue merchandise, interactive or collaborative functions, premium services, and other content. Multi-network relay system 104 may provide multiple views of the venue activity, interspersed with special program materials such as interviews taken with the celebrity hosting the event, other attractions coming to the venue 102, screen shots of interesting or unusual attendees of the venue, contest offers, live opinion polls and poll results resulting from attendees' voting activities, etc. These functions may be accomplished using standardized media constructs such as MPEG 4/7/21 or similar protocol that allow for the identification, cataloging, indexing, archival, and retrieval of multimedia data.

At 240, media content for the event is transmitted via multi-network relay system 104 to portable communications device 116A. Alternatively, if the user is an existing registered service member at 234, the registration/services options are omitted and the user (i.e., service member) receives the media content at 240.

At step 242, it is determined whether advanced services were selected by the user of portable communications device 116A. If only a basic level of services was selected by the user, the process returns to 240 and the user continues to receive only the minimal level service (i.e., media content) and optionally, advertising information. If advanced services were selected by the user at 242, the user receives supplemental media content in accordance with the service level selected by the user at 244. The process returns to step 226 of FIG. 2A.

Figure 2A:
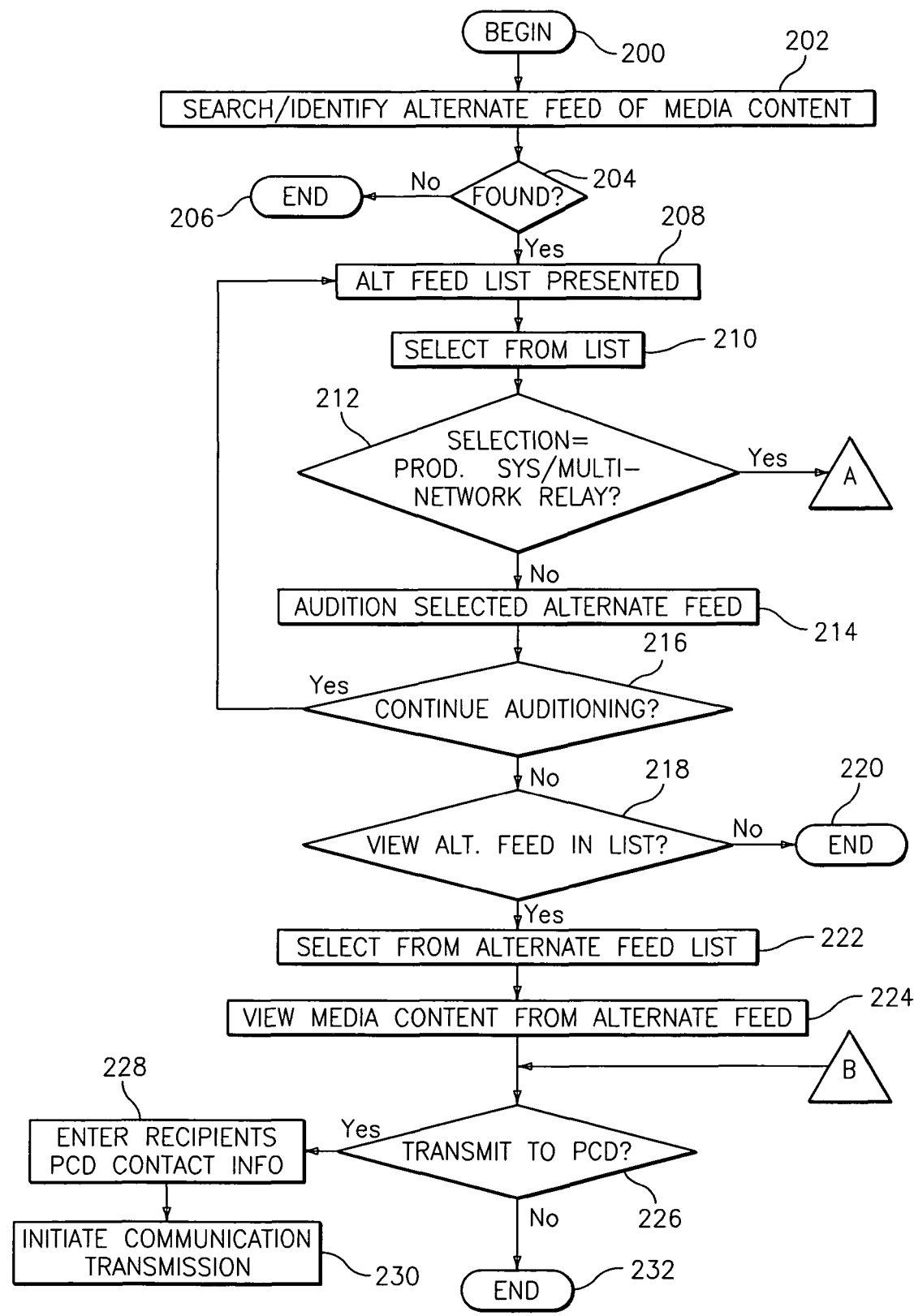
FIGS. 2A and 2B are flowcharts describing a process for implementing the multi-viewpoint media access system by a user of the system in exemplary embodiments.
Figure 2B:
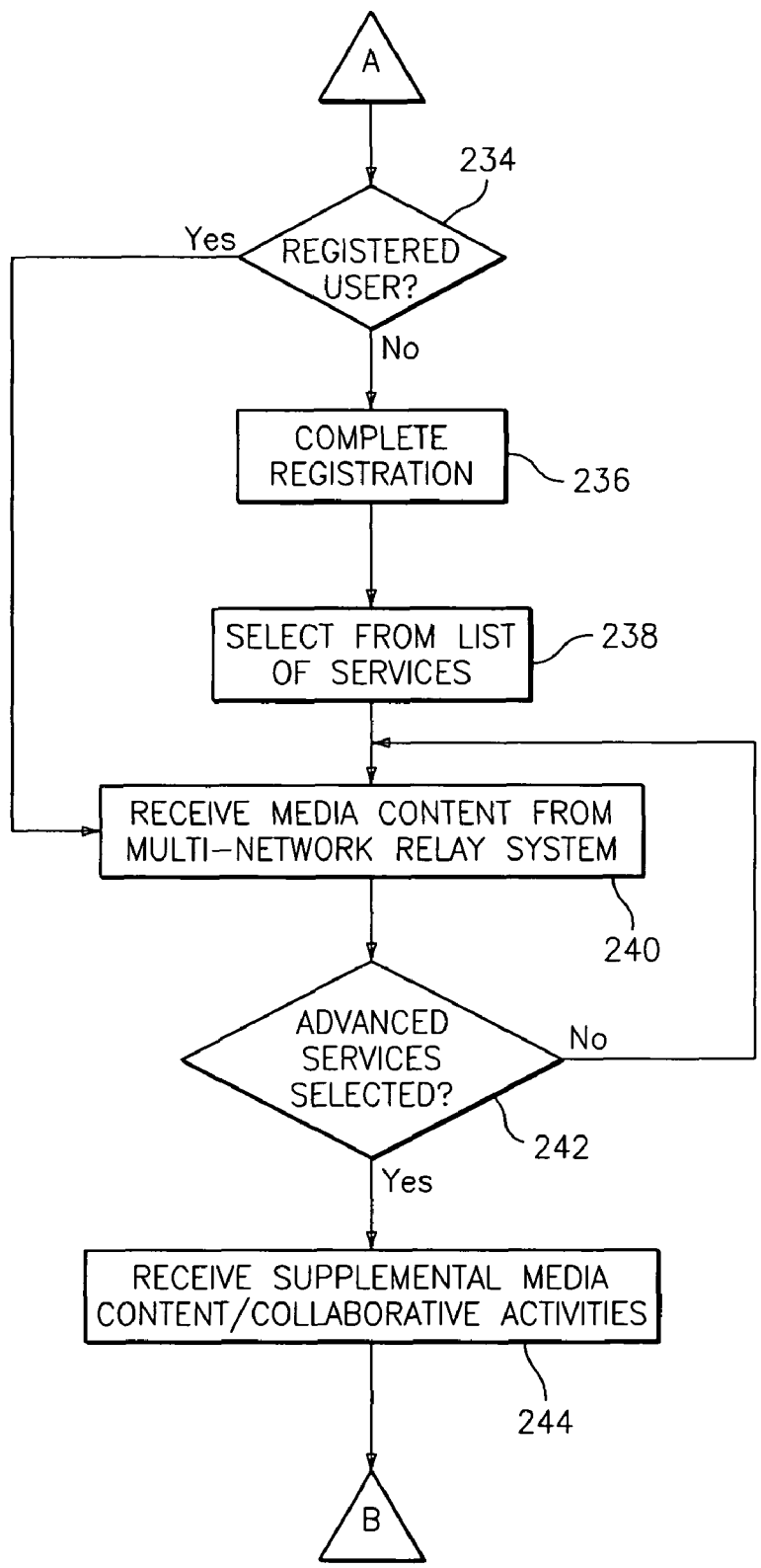

As described in FIGS. 2A and 2B, the multi-viewpoint media access system may be implemented entirely via a peer-to-peer system whereby portable communications devices discover and exchange media content at an event. If desired, these transmissions can also include sending the media content over a communications network (e.g., cell tower 106) to a remote communications device (e.g., 110). Other embodiments include a multi-network relay system and production system that may enhance the event experience by providing a potentially better quality transmission of the event, as well as additional services. Some of these services are also described in FIGS. 2A and 2B.

Figure 3:
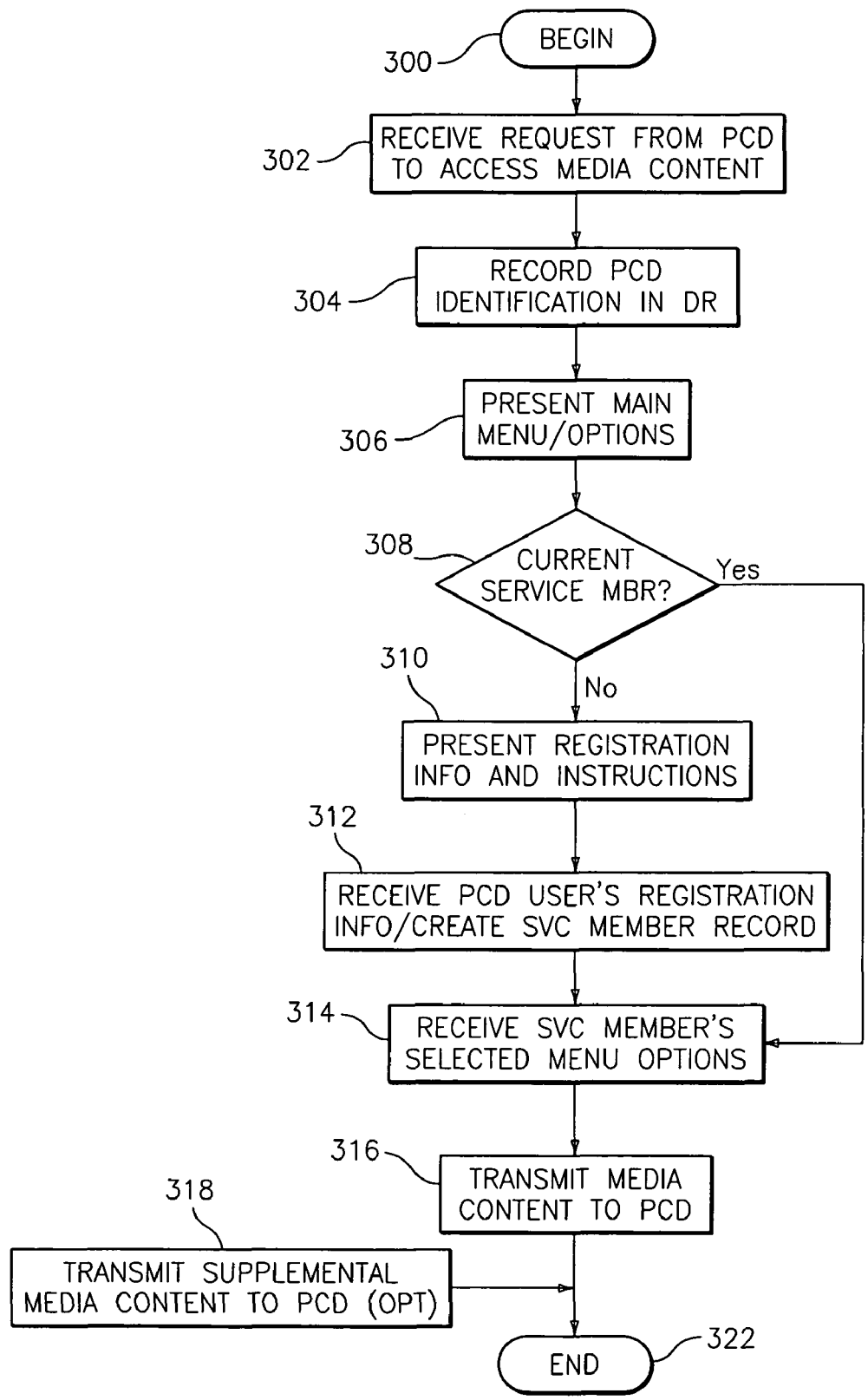
FIG. 3 is a flowchart describing a process for implementing the multi-viewpoint media access system by a service provider of the system in exemplary embodiments.

With an organized, central hosting system such as multi-network relay system 104, in cooperation with production system 114, a wide variety of services may be provided to portable communications device users. Hosting systems may include telecommunication service providers, Internet service providers, application service providers, and other commercial enterprises. FIG. 3 describes a process for implementing the multi-viewpoint media access system via multi-network relay system 104.

At 300, the process begins whereby a request to access media content provided by multi-network relay system 104 is received by server 120 at 302. Multi-network relay system 104 records identification information for the requesting portable communications device in data repository 122 at 304. Identification information may include the caller's phone number or electronic address (e.g., email). A main menu and options for the multi-viewpoint media access system are presented to the portable communications device at 306. A sample menu is shown in FIG. 4.

At 308, it is determined if the requesting portable communications device user is an existing service member. This may be accomplished by checking data repository 122 for the existence of a service member record for the user of the portable device. If the user is not currently registered, registration information and instructions are provided to the portable communications device user at 310. At 312, the portable communications device user's registration information is received at server 120 and a record for the service member is generated and stored in data repository 122. Other responses to menu options presented to the user are received at 316. For example, in addition to requesting personal information, the user may be queried to select from service options provided by the multi-viewpoint media access system such as a service package, or specific options including interactive polling capabilities as described above. Alternatively, if the requesting portable communications device user is a current service member at 308, these responses to menu options previously presented at 306 are received at 316. As indicated above, if media content services are offered to non-ticket holders such as remote communications device 110, the multi-network relay system 104 would establish this before transmitting the media content (e.g., in accordance with the entertainment property rights of the event performers and venue 102). The media content requested by the portable communications device user is then transmitted to the portable communications device at 318. If optional advanced services have been previously selected by the service member, supplemental media content and/or collaborative functions and activities are available to the user at 320 and the process ends at 322.

As indicated above, the multi-viewpoint media access system enables rich media content sharing among portable communication devices that are proximally located, using optimal (e.g., best effort) peer-to-peer discovery and transmission exchange processes, as well as a multi-networking relay system for enhanced media content transmission and value-added services. Portable communications devices discover and audition alternate feeds of media content to determine an optimal vantage point and may select the desired portable communications device from which a transmission feed is requested.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing multi-viewpoint media-sharing activities, comprising:
    identifying an alternate feed of media content by a first portable communications device that is operated by a first user, the alternate feed of media content captured by a second portable communications device that is operated by a second user at an event;
    performing real-time auditioning of the media content by the first portable communications device operable for assessing a vantage point of the media content with respect to the event, the real-time auditioning including viewing the alternate feed of media content captured by the second portable communications device at the first portable communications device to allow the first user to evaluate the alternate feed of media content; and
    receiving the alternate feed of media content at the first portable communications device in response to a request transmitted by the first portable communications device;
    wherein the first portable communications device and the second portable communications device are in geographic propinquity of the event; and
    wherein the performing real-time auditioning of the media content includes:
        receiving via transmission the alternate feed of media content; and
        evaluating desirability of the alternate feed of media content for a limited time before making a determination whether to accept the alternate feed of media content;
    wherein the alternate feed of media content includes an exit route directing the first portable communications device away from the event.

2. The method of claim 1, further comprising:
    transmitting the media content received by the first portable communications device via the alternate feed to a remote communications device, the first portable communications device in communication with the remote communications device over a long-distance communication network.

3. The method of claim 2 wherein the remote communications device includes a portable telephone.

4. The method of claim 3, wherein the alternate feed of media content comprises
    a video stream.

5. The method of claim 3, wherein the alternate feed of media content comprises
    physical coordinates.

6. The method of claim 2, wherein the remote communications device comprises an information generation component that performs measurements,
    the information-generation component comprising
        a global positioning system operable for identifying and transmitting physical coordinates of the remote communications device;
    wherein the measurements are transmittable by the remote communications device.

7. The method of claim 1, wherein the first portable communications devices comprises
    a cellular telephone.

8. The method of claim 7, wherein the first portable communications devices includes an information-generation component that performs measurements,
    the information-generation component comprising
        a global positioning system operable for identifying and transmitting physical coordinates of the first portable communications device;
    wherein the measurements are transmittable by the first portable communications device.

9. The method of claim 1, wherein the identifying an alternate feed of media content is accomplished via a sensor, the sensor transmitting a broadcast signal via a peer-to-peer network operable for enabling the first portable communications device to discover it.

10. The method of claim 1, wherein the identifying an alternate feed of media content is accomplished by a telecommunications system that identifies portable communications devices that are proximally close and providing contact information to the portable communications devices.

11. A non-transitory storage medium encoded with machine-readable computer program code for providing multi-viewpoint media-sharing activities, the storage medium including instructions for causing the portable communication device to implement a method comprising:
    identifying an alternate feed of media content by a first portable communications device that is operated by a first user, the alternate feed of media content captured by a second portable communications device that is operated by a second user at an event;
    performing real-time auditioning of the media content by the first portable communications device operable for assessing vantage point of the media content with respect to the event, the real-time auditioning including viewing the alternate feed of media content captured by the second portable communications device at the first portable communications device to allow the first user to evaluate the alternate feed of media content; and receiving the alternate feed of media content at the first portable communications device in response to a request transmitted by the first portable communications device;

wherein the first portable communications device and the second portable communications device are in geographic propinquity of the event; and wherein the performing real-time auditioning of the media content includes:

receiving via transmission the alternate feed of media content; and evaluating desirability of the alternate feed of media content for a limited time before making a determination whether to accept the alternate feed of media content;

wherein the alternate feed of media content includes an exit route directing the first portable communications device away from the event.

12. The storage medium of claim 11, further comprising instructions for causing the first portable communications device to implement:

transmitting the media content received by the first portable communications device via the alternate feed to a remote communications device.

13. The storage medium of claim 12 wherein the remote communications device includes
a portable telephone.

14. The storage medium of claim 13, wherein the alternate feed of media content comprises
a video stream.

15. The storage medium of claim 13, wherein the alternate feed of media content comprises
physical coordinates.

16. The storage medium of claim 12, wherein the remote communications device comprises an information generation component that performs measurements,
the information-generation component comprising
a global positioning system operable for identifying and transmitting physical coordinates of the remote communications device;
wherein the measurements are transmittable by the remote communications device.

17. The storage medium of claim 11, wherein the first portable communications devices comprises:
a cellular telephone.

18. The storage medium of claim 17, wherein the first portable communications devices include an information-generation component that performs measurements, the information-generation component comprising
a global positioning system operable for identifying and transmitting physical coordinates of the first portable communications device;
wherein the measurements are transmittable by the first portable communications device.

19. The storage medium of claim 11, wherein the identifying an alternate feed of media content is accomplished via a sensor, the sensor transmitting a broadcast signal via a peer-to-peer network operable for enabling the first portable communications device to discover it.

20. The storage medium of claim 11, wherein the identifying an alternate feed of media content is accomplished by a telecommunications system that identifies portable communications devices that are proximally close and providing contact information to the portable communications devices.

21. A system for providing multi-viewpoint media-sharing activities, comprising:
a first portable communications device operated by a first user;
a second portable communications device in geographic propinquity of the first portable communications device, the second portable communications device operated by a second user; and
a multi-viewpoint media access system executing on the first portable communications device and the second portable communications device;
wherein the multi-viewpoint media access system performs:
identifying an alternate feed of media content, the alternate feed of media content originating from the second portable communications device at an event;
receiving a request to perform real-time auditioning of the media content by the first portable communications device operable for assessing a vantage point of the media content with respect to the event, the real-time auditioning including viewing the alternate feed of media content captured by the second portable communications device at the first portable communications device to allow the first user to evaluate the alternate feed of media content; and
upon selecting the alternate feed of media content by the first portable communications device, receiving via transmission the alternate feed at the first portable communications device;
wherein the performing real-time auditioning of the media content includes
evaluating desirability of the alternate feed of media content for a limited time before making a determination whether to accept the alternate feed of media content;
wherein the alternate feed of media content includes an exit route directing the first portable communications device away from the event.

22. The system of claim 21, further comprising an information-generation component residing on the first portable communications device, the information-generation component performing measurements and including
a global positioning system operable for identifying and transmitting physical coordinates of the first portable communications device;
wherein the measurements are transmittable by the first portable communications device.

* * * * *